(12) United States Patent
Lachwani et al.

(10) Patent No.: US 9,128,718 B1
(45) Date of Patent: Sep. 8, 2015

(54) SUSPEND USING INTERNAL REWRITEABLE MEMORY

(75) Inventors: Manish Lachwani, Sunnyvale, CA (US); David Berbessou, Sunnyvale, CA (US)

(73) Assignee: Amazon Technologies, Inc., Reno, NV (US)

(*) Notice: Subject to any disclaimer, the term of this patent is extended or adjusted under 35 U.S.C. 154(b) by 817 days.

(21) Appl. No.: 12/749,168

(22) Filed: Mar. 29, 2010

(51) Int. Cl.
G06F 1/00 (2006.01)
G06F 1/32 (2006.01)

(52) U.S. Cl.
CPC ............ *G06F 1/3275* (2013.01); *G06F 1/3287* (2013.01); *G06F 2212/2022* (2013.01); *Y02B 60/34* (2013.01)

(58) Field of Classification Search
CPC .......... G06F 1/3275; G06F 2212/2022; G06F 1/3287; Y02B 60/34
USPC ........................................................ 713/322
See application file for complete search history.

(56) References Cited

U.S. PATENT DOCUMENTS

| | | | |
|---|---|---|---|
| 2008/0031588 A1* | 2/2008 | Leung et al. | 386/83 |
| 2008/0034240 A1* | 2/2008 | Park | 713/323 |
| 2009/0172428 A1* | 7/2009 | Lee | 713/300 |
| 2009/0292934 A1* | 11/2009 | Esliger | 713/323 |
| 2010/0083019 A1* | 4/2010 | Aoki | 713/320 |
| 2011/0058214 A1* | 3/2011 | Park et al. | 358/1.15 |

OTHER PUBLICATIONS

"Program Counter", Wikipedia.*

* cited by examiner

*Primary Examiner* — Jaweed A Abbaszadeh
*Assistant Examiner* — Xuxing Chen
(74) *Attorney, Agent, or Firm* — Lee & Hayes, PLLC

(57) ABSTRACT

Power consumption while in a low power suspend mode is enhanced by placing a portion of suspend and resume instructions into internal rewriteable memory, such as internal random access memory ("IRAM"). During entry into suspend, control is transferred from instructions stored in an external memory to instructions stored within the internal rewriteable memory. These instructions are configured to reduce power consumption of the external memory by reducing a slew rate, drive strength, and so forth. Upon awakening from suspend, the instructions within the internal rewriteable memory place the external memory back to an operational state and control passes back to the instructions stored within external memory.

25 Claims, 5 Drawing Sheets

SUSPEND USING INTERNAL REWRITEABLE MEMORY

BACKGROUND

Electronic devices such as electronic book reader devices ("eBook reader devices"), cellular telephones, portable media players, desktop computers, laptops, tablet computers, netbooks, personal digital assistants, and the like, rely on electrical power to function.

Within these electronic devices, several components utilize power during operation, including the processor(s) and peripheral devices. These peripherals include external memory interfaces (EMIs), external memory, Universal Serial Bus (USB) host controllers, USB device controllers, image processing units (IPUs), and so forth. These peripherals may reside on the same "chip" or die as the processor, on another die, or a combination of same die and another die.

Within these electronic devices, the processor may execute instructions stored on a computer-readable storage medium to perform a variety of actions. Among these actions may be instructions to enter a suspend mode and cease or reduce operation of the electronic device or portions thereof to conserve power. Traditionally, instructions controlling the suspend mode have been executed from the external memory. However, such a practice leaves the external memory consuming an unnecessary amount of electrical power while in a suspend mode.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
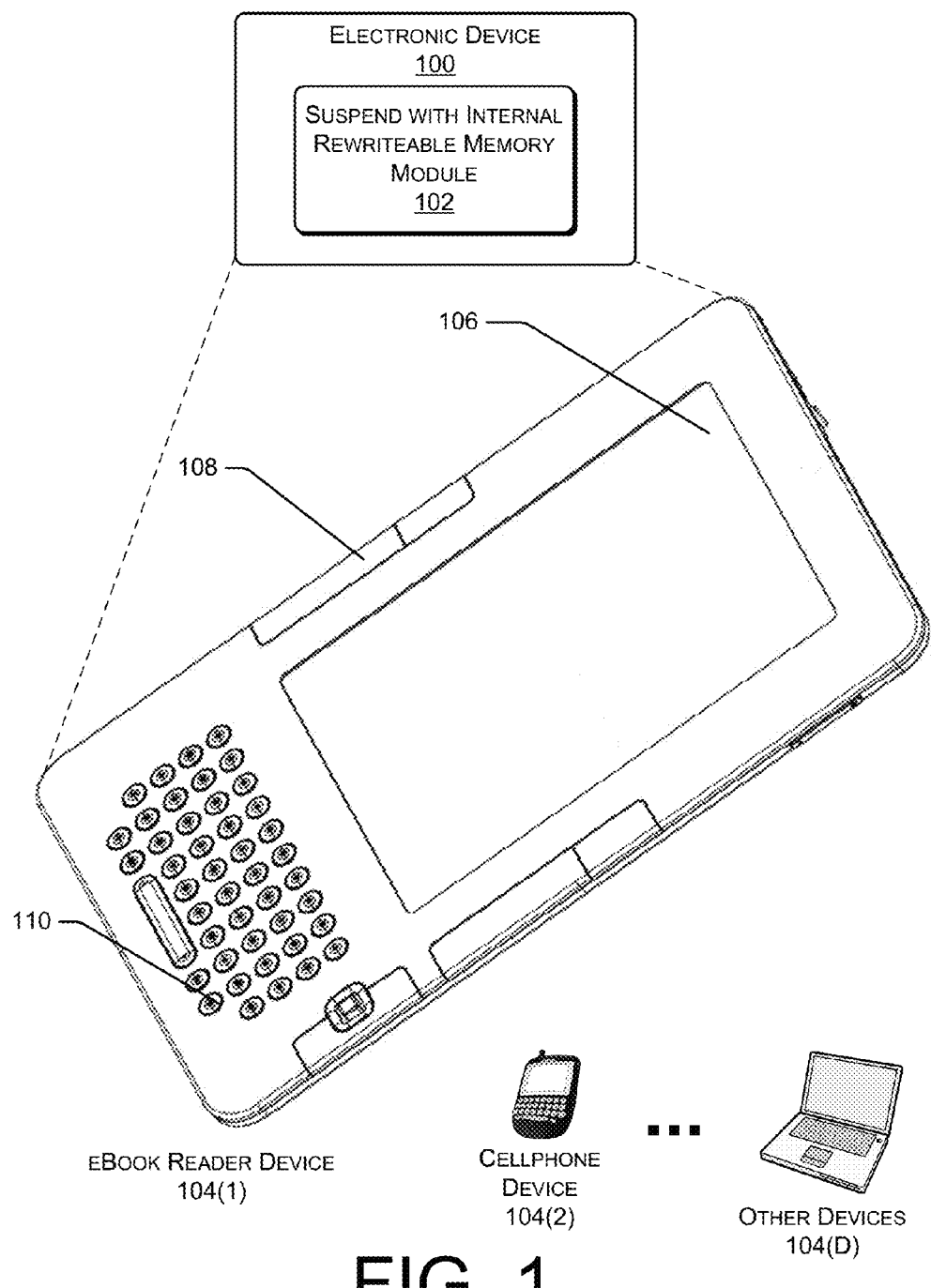
FIG. 1 is an illustrative electronic book (eBook) reader device configured to enter and exit a suspend mode using internal rewriteable memory.

As described above, instructions to place a processor and other components and peripherals within an electronic device into a suspend mode have traditionally been executed from an external memory, such as random access memory ("RAM"). External memory includes memory that is indirectly accessible to the processor. For example, external memory includes synchronous dynamic random access memory ("SDRAM") coupled to the processor via an external memory interface ("EMI").

However, external memory such as RAM is volatile, and requires constant refresh to retain information stored within. During a suspend mode, external memory may be placed into a self-refresh mode, in which the data contents of the external memory are refreshed without requiring an external memory controller.

Self-refresh mode permits the suspend mode to achieve power reductions by gating or turning off memory controllers, clocks, and so forth. However, the external memory is still consuming power.

Power consumption in an external memory device such as synchronous dynamic RAM ("SDRAM") is proportional to the drive strength, slew rate, and other pad settings or operational parameters. Once integrated into a larger computational system, the external memory is typically configured for a single set of operational parameters which have been determined to provide reliable operation within that system within desired operational limits.

Reliable operation is that set of operational parameters which allow for transfer of data to and from the external memory device within typical operating parameters such as error rate, data transfer rate, and so forth. In contrast, unreliable operation results in an inability to transfer data or transfer of data with unacceptably high error rates, retries, and so forth.

One of the operational parameters for external memory devices is drive strength. Drive strength is an indication of how much current is available during a transition from one logic state to another, for example a low voltage to a high voltage. While an external memory device may support several drive strength settings, once integrated into the system of the electronic device, a particular setting may be required to provide reliable operation. For example, in many implementations the drive strength is at maximum while the slew rate is fast.

Thus, it becomes desirable to reduce the drive current when the external memory is not in use and the system is not constrained to providing reliable operation. Such a reduction becomes possible when the memory is not in use, because reducing the drive current while trying to maintain accessibility of the external memory may result in undefined system behavior. Such undefined system behavior may lead to halts, freezes, erratic results, and so forth.

Power consumption in an external memory device is also affected by other operational parameters, such as the slew rate setting. Slew rate indicates a rate of change of signaling to the memory device, typically expressed as volts per unit of time. External memory typically supports two or more available slew rates. Generally, the higher the slew rate, the greater the power consumed by the memory device circuitry. Similar to the drive current, it thus becomes desirable to reduce the slew rate when the memory is not in use. However, reducing the slew rate while trying to maintain accessibility of the external memory may result in undefined system behavior.

Thus, while it is desirable to reduce the power consumption of external memory, doing so may render that memory incapable of access. Without access, a processor is unable to read the entirety of instructions which would complete entry into the suspend mode, or allow awakening to run mode. To alleviate this problem, the techniques described below store a portion of the suspend mode instructions in an internal rewriteable memory. With suspend mode instructions stored within the internal rewriteable memory, it is no longer necessary to maintain the operational parameters for the external memory.

This disclosure describes, in part, techniques for entering and exiting a suspend mode using an internal rewriteable memory to store instructions configured to reduce power consumption of external memory while in the suspend mode.

Numerous benefits accrue from reducing power consumption of the external memory while in the suspend mode. One such benefit includes increasing the battery life of the electronic device while in suspend mode. For example, an electronic device may be packaged and delivered to a consumer in a suspend mode. By placing the device into suspend mode, a rapid initial start and a positive first user experience with the external device is possible. Furthermore, the low latency of the rewriteable internal memory facilitates the rapid start and fast entry into the suspend mode. For example, access to internal RAM from an ARM1136 processor, the level 2 cache controller, or both has significantly faster access times than external RAM accesses (via alternate bus masters). By reducing power consumption of the external memory during suspend mode, a length of time in which the device may be in suspend mode is increased. During the final stages of entry into the suspend mode, control is passed from instructions stored within the external memory to suspend mode instructions stored within the internal rewriteable memory. A portion of these suspend mode instructions enters the suspend mode by synchronizing memory caches with the external memory, disabling the caches, and changing the operational parameters of the external memory. For example, the drive strength and slew rate may be dropped to the lowest levels available to the external memory hardware. The final steps of the suspend mode may then be executed, such as setting a wait-for-interrupt. The sequence of operations may be varied to suit the particular architectural needs, such as placing the external memory into self-refresh then changing the operational parameters of the external memory. In some implementations, switcher voltage for the external memory may also be reduced after the external memory drive strength is reduced.

Upon receiving a wakeup event, the processor looks for instructions within the internal rewriteable memory, as the external memory is inaccessible due to the change in operational parameters. Within the internal rewriteable memory resume run mode instructions, or wakeup instructions, are stored. These instructions return the operational parameters of the external memory to their awake run values, enable memory caches such as the instruction/data cache and level 2 (L2) cache, and then transfer control to the remaining instructions stored within the external memory.

The transfer of control between the external memory and internal rewriteable memory may be accomplished in several ways. For example, a program counter (also known as an "instruction pointer") register within a processor typically contains a memory address where the next command to be executed by the process is stored. The transfer of control may thus entail changing the program counter to look for instructions at an address within the internal rewriteable memory rather than an address within the external memory.

Internal rewriteable memory provides a convenient location for storing these suspend mode instructions. Internal rewriteable memory remains intact and available while the processor coupled to it is in a suspend mode. In addition, the internal rewriteable memory requires no separate memory controller and provides sufficient space for storage of assembly language instructions. In one implementation internal rewriteable memory may be directly coupled to the processor, such as internal RAM ("IRAM"). However, in other implementations the suspend mode instructions may be stored in other memory which remains accessible while the external memory is in a low power state. For example, memory within an image processing unit, interface, peripheral, and so forth may be used to store the suspend mode instructions.

The techniques described herein may be implemented by an electronic device with a processor, internal rewriteable memory and external memory, such as an electronic book (eBook) reader device or any other type of electronic device. The device, such as the eBook reader device, incorporates at least one processor executing an operating system, including, but not limited to, Linux®, UNIX®, Microsoft Corporation's Microsoft Windows®, Microsoft Corporation's Windows Mobile®, Apple Corporation's Mac OS®, Apple Corporation's Mac OS X®, and Wind River Systems Inc.'s VxWorks® operating systems.

The example eBook reader device discussed herein may incorporate a processor from Freescale Semiconductor Inc. of Austin, Tex. using an i.MX architecture and executing a Linux® kernel. The kernel may use a device driver to communicate with peripherals such as an external memory interface ("EMI"), Universal Serial Bus ("USB") controller, image processing unit ("IPU"), and so forth. These peripheral devices may reside on the same "chip" or die as the processor as in the case of the i.MX architecture, be on another die, or a combination of the same die and another die. A configuration where one or more processors and associated peripherals are on the same die may be known as a "system on a chip" ("SOC").

Other architectures including processors with internal rewriteable memory may be used. For example, some of these architectures include the Open Multimedia Application Platform ("OMAP") from Texas Instruments Inc. of Dallas, Tex.; Marvell platform from Marvell Technology Group Ltd. of Santa Clara, Calif.; the x86 platform from Intel Corporation of Santa Clara, Calif.; the MIPS platform from MIPS Technologies Inc. of Sunnyvale, Calif.; and so forth. In some implementations, this internal rewriteable memory may be referred to as "internal random access memory," "tightly coupled memory," "static random access memory," or "scratchpad memory."

While this overview describes storing suspend mode instructions in internal rewriteable memory in terms of an eBook reader device, the concepts described herein may also be applicable to cellular telephones, portable media players, desktop computers, laptops, tablet computers, medical devices, servers, netbooks, servers, personal digital assistants, or other electronic devices.

Illustrative eBook Reader Device

FIG. 1 is an illustrative electronic device 100 configured to enter and exit a suspend mode using internal rewriteable memory by way of a suspend using internal rewriteable memory module 102. The suspend using internal rewriteable memory module 102 provides instructions that, when executed, place the electronic device 100 into a suspend mode. The module 102 also permits resuming an run mode upon exit of the suspend mode. The suspend using internal rewriteable memory module 102 stores at least a portion of suspend mode instructions within an internal rewriteable memory, and is discussed in more detail below with regards to FIG. 2.

Several devices are shown in this illustration that may utilize the suspend using internal rewriteable memory module 102. For example, an electronic book (eBook) reader device 104(1) is shown embodied as a handheld, dedicated eBook reader device. FIG. 1 also illustrates that a cellphone device 104(2) and other devices 104(D), such as a netbook computer, may include and implement the suspend using internal rewriteable memory module 102. As used herein, letters within parenthesis such as "(D)" indicate an integer greater than zero.

The eBook reader device 104(1) may have a display 106 to present content in a human-readable format to a user. The display 106 may be reflective, emissive, or a combination of both. Reflective displays utilize incident light and include electrophoretic displays, interferometric modulator displays, cholesteric displays, and so forth. Emissive displays do not rely on incident light and, instead, emit light. Emissive displays include backlit liquid crystal displays, time multiplexed optical shutter displays, light emitting diode displays, and so forth. When multiple displays are present, these displays may be of the same or different types. For example, one display may be an electrophoretic display while another may be a liquid crystal display.

The content presented on the display 106 may take the form of electronic books or "eBooks." For example, the display 106 may depict the text of the eBooks and also any illustrations, tables, or graphic elements that might be contained in the eBooks. The terms "book" and/or "eBook," as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The display 106 may further include touch screen capabilities that allow user input through contact or gesturing relative to the display. For convenience only, the display 106 is shown in a generally rectangular configuration. However, the display 106 may be implemented in any shape, and may have any ratio of height to width. Also, for stylistic or design purposes, the display 106 may be curved or otherwise non-linearly shaped. Furthermore the display 106 may be flexible and configured to fold or roll.

The eBook reader device 104(1) may also incorporate a keypad that includes one or more actuable controls 108 and a keyboard 110 for user input. The one or more actuatable controls 108 may have dedicated or assigned operations. For instance, the actuatable controls 108 may include page turning buttons, a joystick, navigational keys, a power on/off button, selection keys, joystick, touchpad, and so on. Furthermore, the keypad may include any other controls configured to receive any other sort of user input via buttons, touch screen inputs, or the like.

While one embodiment of an electronic device 100 is shown in relation to the eBook reader device 104(1), it is understood that electronic device may include cellular telephones 104(2), and other devices 104(D) such as portable media players, desktop computers, laptops, tablet computers, netbooks, personal digital assistants, servers, medical devices, and the like.

Figure 2:
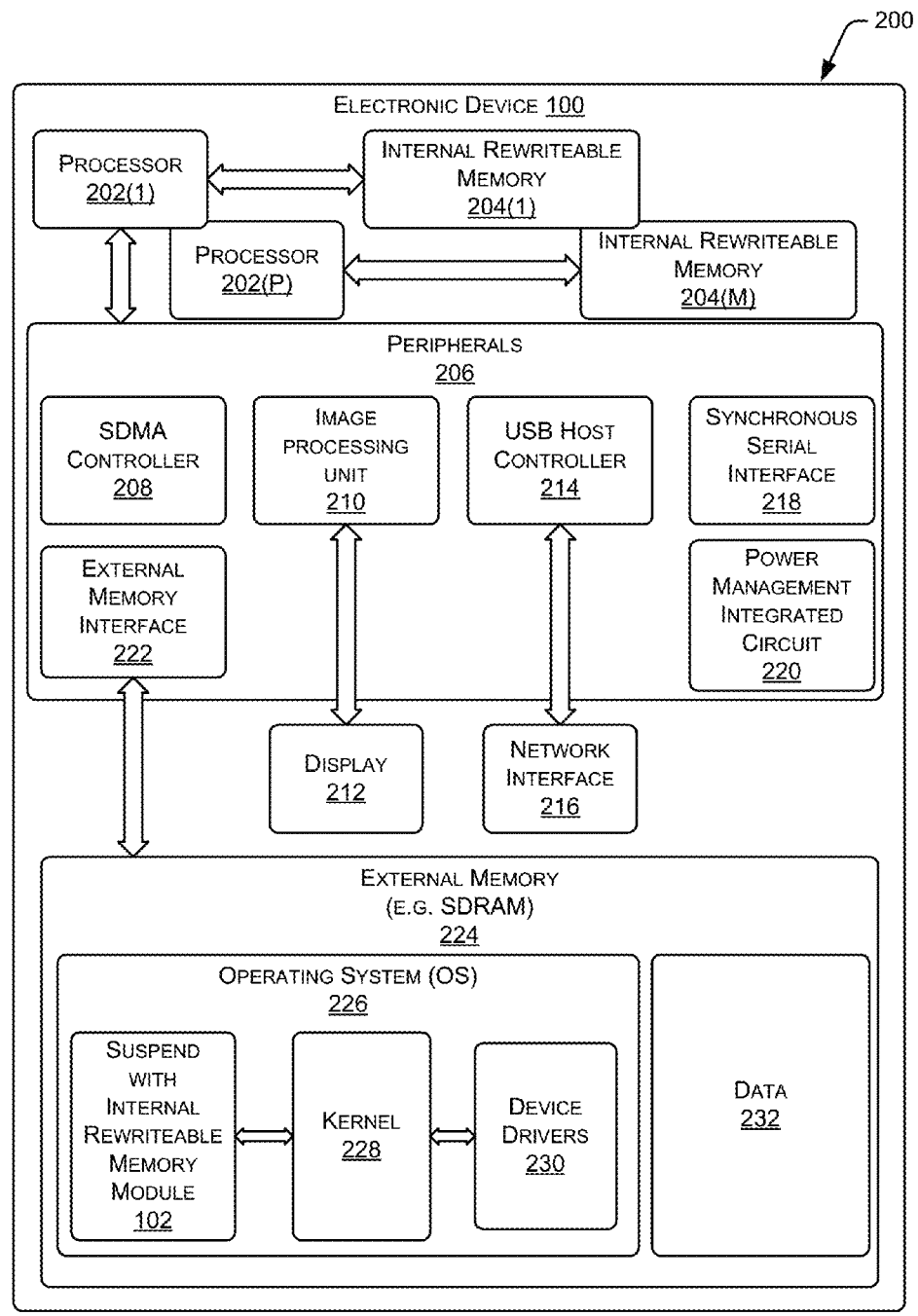
FIG. 2 is an illustrative schematic of an electronic device, such as the eBook reader device of FIG. 1, configured to enter and exit a suspend mode using internal rewriteable memory.

FIG. 2 illustrates selected functional components 200 that might be implemented in the electronic device 100. In a very basic configuration, the device 100 includes components such as one or more processors 202(1), . . . , 202(P) and internal memories 204(1), . . . , 204(M). Each processor 202 may itself comprise one or more processors. In some implementations there may be a plurality of the processors 202(1)-(P). Likewise, in some implementations there may be a plurality of the internal memories 204(1)-(M). In some implementations, the internal rewriteable memory may also be known as "internal random access memory," "tightly coupled memory," or "scratchpad memory."

Depending on the configuration of a device 100, the internal rewriteable memory 204 comprises computer-readable storage media and may include volatile and nonvolatile memory. Thus, the internal rewriteable memory 204 may include, but is not limited to, RAM, flash memory, other memory technology, or any other medium that can be used to store data including executable instructions and which can be accessed by the electronic device 100.

One or more peripherals 206 may couple to the processor 202. For instance, FIG. 2 illustrates that a smart direct memory access ("SDMA") controller 208 may provide direct memory access functionality to the processor and attached peripherals.

FIG. 2 also illustrates an image processing unit 210 coupled to one or more of the displays 212. For example, this display 212 may be display 106 on eBook reader device 104(1) described above. In some implementations, multiple displays may be present and coupled to the image processing unit 210. In some implementations, one or more image processing units 210 may couple to the multiple displays.

Electronic device 100 may have a keypad that may be the same, for example, as the keypad on eBook reader device 104(1) described above with reference to FIG. 1 and having the user actuable controls 108. A hard drive, which may use magnetic or optical memory on spinning disks or solid state storage, may be present to store information, such as eBooks.

FIG. 2 also illustrates that the electronic device 100 may include a USB host controller 214. The USB host controller 214 manages communications between devices attached to a universal serial bus ("USB") and the processor 202 and other peripherals. The USB host controller 214 may couple to a network interface 216 via the universal serial bus. Network interface 216 may allow for connection to wired or wireless local or wide area networks.

The electronic device 100 may also include a synchronous serial interface ("SSI") 218. The SSI 218 provides a serial interface for connection with additional peripherals. For example, the SSI 218 may provide a connection to a digital audio multiplexor (MUX), which may configured to convert digital signals to audio, and vice versa.

A power management integrated circuit ("PMIC") 220 is also present. For example, within the Freescale i.MX architecture, the PMIC may comprise the Atlas PMIC. The PMIC, also known as a power management module, provides several functions including the ability to gate specific components, supply varying voltages to particular components, and so forth. In some implementations the PMIC may reside on the same "chip" or die as the processor 202. The PMIC 220 may be configured to generate a notification or interrupt upon an event such as connection or disconnection of an external power supply, activation of a user actuable controls, and so forth. The PMIC 220 may also incorporate a wakeup timer, configured to awaken a device to run mode after a pre-determined elapsed time.

An External Memory Interface ("EMI") 222 may also couple to external memory 224. The EMI 222 manages access to data stored in the external memory 224. The external memory 224 may comprise Static Random Access Memory ("SRAM"), Pseudostatic Random Access Memory ("PSRAM"), Synchronous Dynamic Random Access Memory ("SDRAM"), Double Data Rate SDRAM ("DDR"), or other computer-readable storage media.

The external memory 224 may be used to store any number of functional components that are executable on the processing units 202(1)-(P), as well as data including content items such as eBooks. Thus, the external memory 224 may store an operating system 226 comprising a kernel 228 operatively coupled to one or more device drivers 230. Device drivers 230 are also operatively coupled to peripherals 206. The kernel 228 may also couple to the suspend using internal rewriteable memory module 102, as introduced above with respect to FIG. 1. In some implementations, the suspend using internal rewriteable memory module 102 may be internal to the kernel 228.

The electronic device 100 may also include other non-illustrated peripheral devices. These other devices may include a Firewire bus, camera, global positioning system, Bluetooth™ wireless interface, PC Card component, and so forth.

Couplings, such as that between the kernel 228 and the device driver 230, are shown for emphasis. There are couplings between many of the components illustrated in FIG. 2, but graphical arrows are omitted for clarity of illustration.

Illustrative Process for Suspend Using Internal Rewriteable Memory

Figure 3:
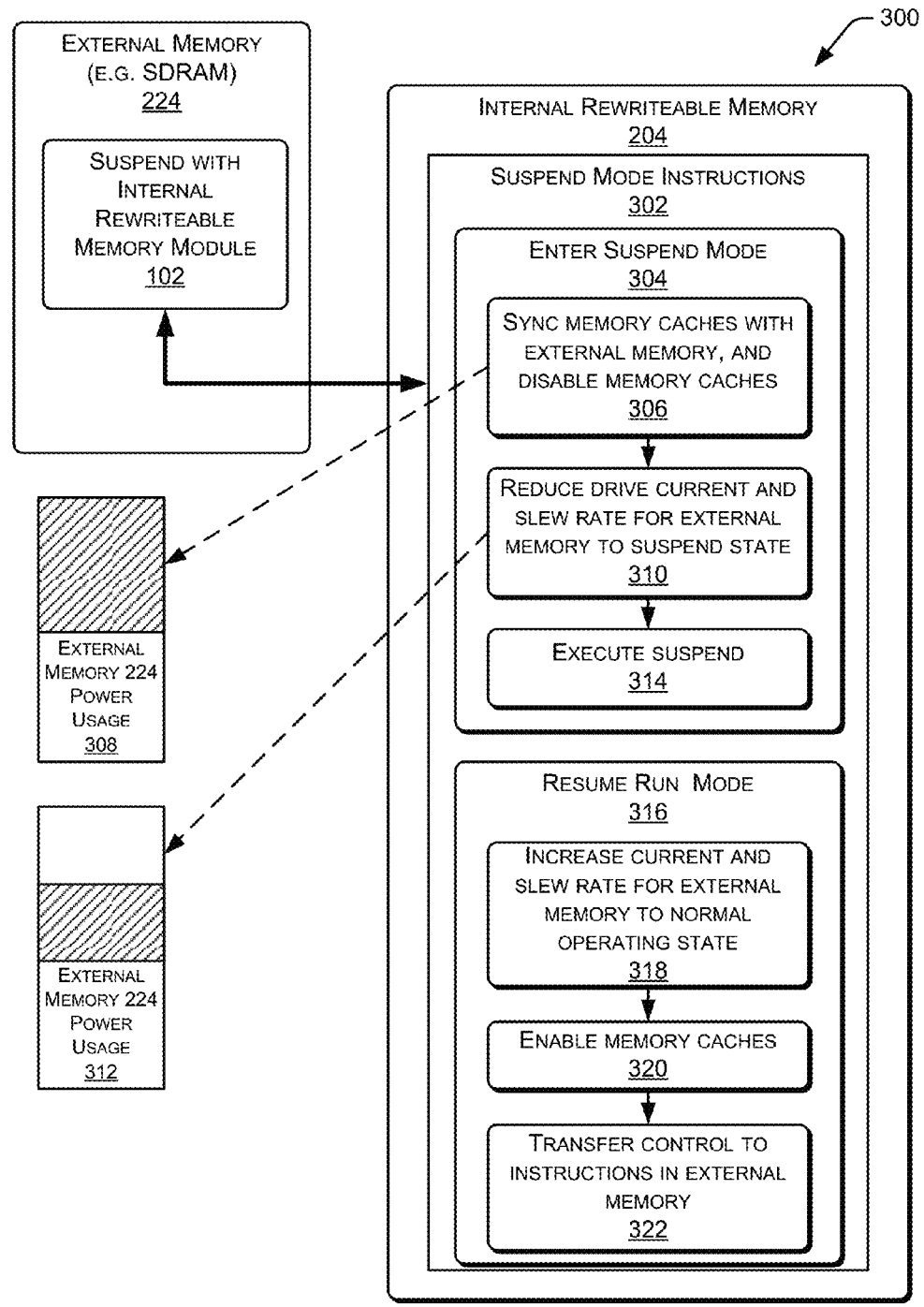
FIG. 3 is an illustration of an example configuration of internal rewriteable memory and a process associated with suspend mode instructions stored therein.
Figure 4:
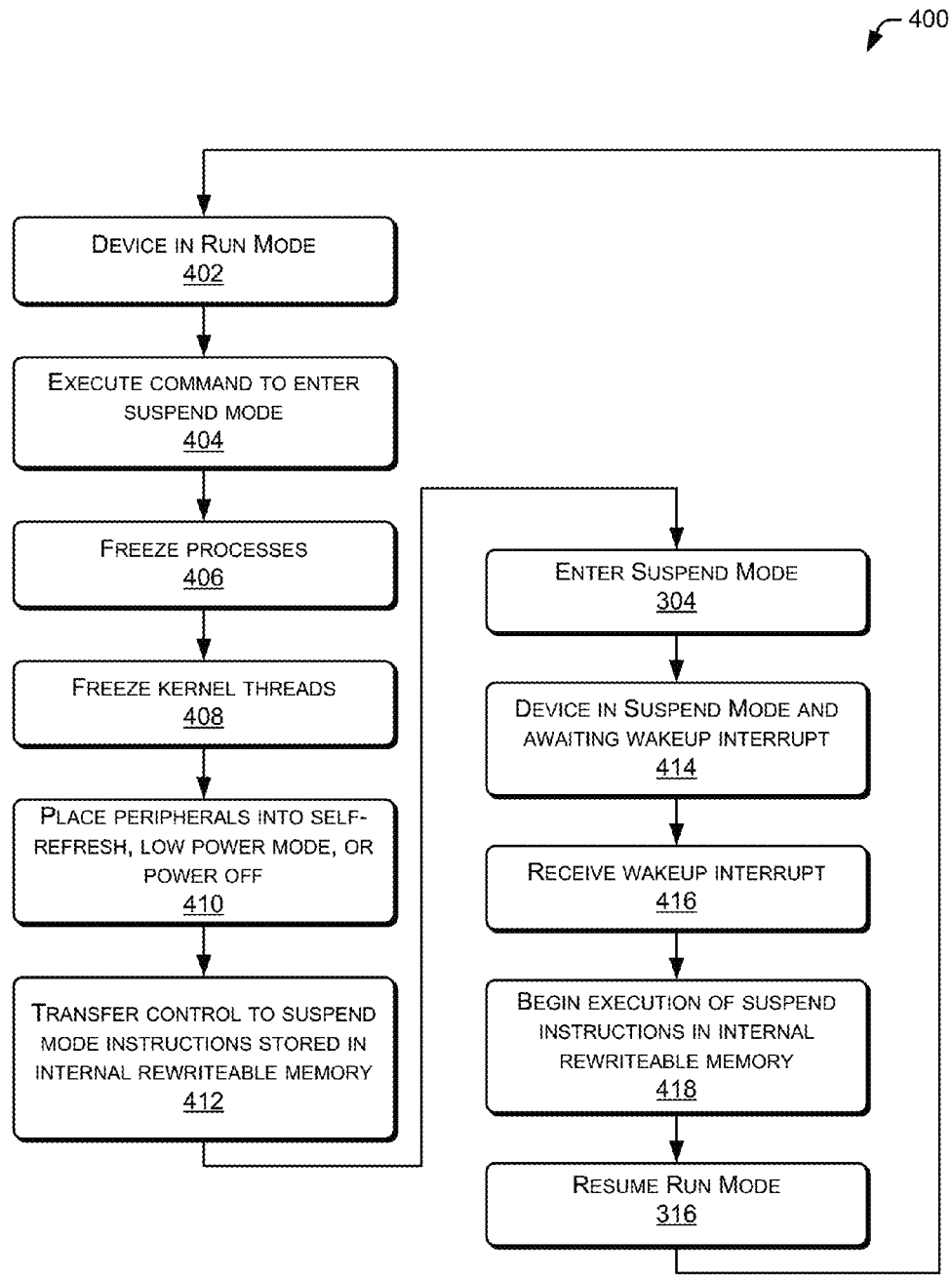
FIG. 4 is an illustrative flow diagram of a process of entering and exiting a suspend mode using internal rewriteable memory.
Figure 5:
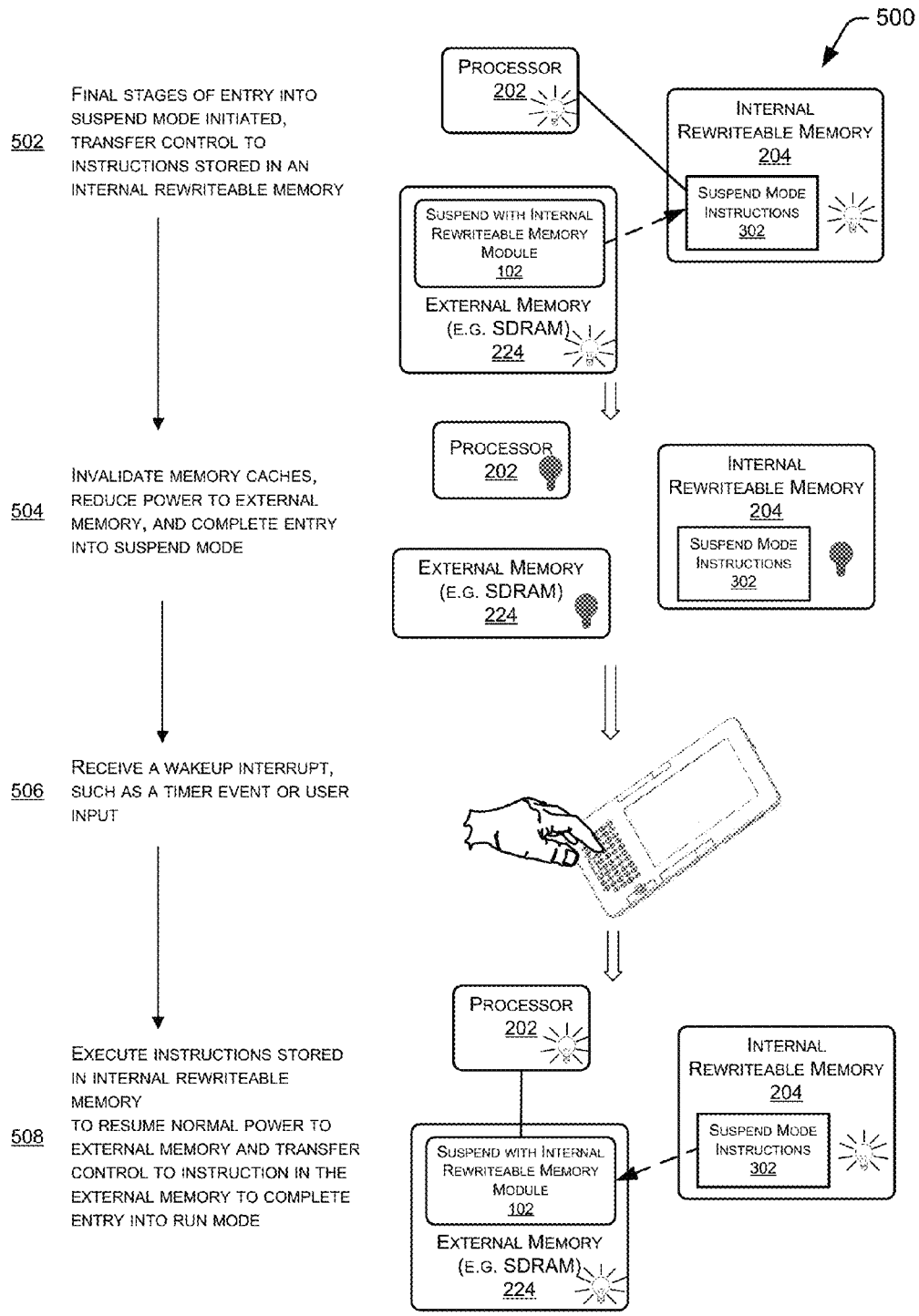
FIG. 5 is an illustrative process for entering and exiting a suspend mode using internal rewriteable memory.

FIGS. 3, 4, and 5 illustrate example processes 300, 400 and 500 that may be implemented by the architecture of FIGS. 1-2 or by other architectures. These processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. For ease of discussion, but not by way of limitation, the following figures include references to functions, commands, and/or other elements found in the Linux® operating system executing on an ARM®-based processor. It is understood that the following processes may be implemented on other operating systems as well as other processor architectures.

FIG. 3 is an illustration of an example configuration of internal rewriteable memory and a process 300 associated with suspend mode instructions data stored therein.

External memory 224 may store the entire suspend using internal rewriteable memory module 102. However, due to the typically small size constraints of the internal rewriteable memory 204 relative to the external memory 224, only a portion of the suspend using internal rewriteable memory module 102 may be stored in the internal rewriteable memory 204. This portion, designated suspend mode instructions 302, provides for the final steps of the entry into a suspend mode and the initial steps of a resume run mode. The suspend mode instructions 302 may be loaded into the internal rewriteable memory 204 from the external memory 224.

The suspend mode instructions 302 include instructions configured to cause the electronic device to enter suspend mode 304 when a processor executes the instructions. The instructions may vary depending upon the specific hardware and associated architecture. In one implementation as shown here, an instruction to synchronize memory caches with external memory 224 is provided at 306. Once synchronization with the caches is complete, the memory caches are disabled. This process of synchronizing and disabling caches may also be known as "invalidating" a cache. Memory caches may include caches for the processor 202 and include level 1, level 2, and other caches.

Also shown here at 308 is a graph of power consumption by the external memory 224. At 308, the external memory 224 remains at normal operational power levels, and thus is consuming 100% of power. For example, in the Freescale i.MX architecture, power to the external memory 224 pads at this point, while powered for normal operation but with the memory not being accessed is about 0.7 milliamps (mA) in some implementations. Normal operation of external memory 224 occurs when the external memory 224 is configured and operating such that data is transferrable within intended specifications for the electronic device 100. During normal operation data is transferred to and from external memory 224 with no or minimal errors, allowing reliable or intended operation of the electronic device 100.

Once the caches have been invalidated, at 310 instructions are given to set the drive current, slew rate, and other operational parameters of the external memory 224 to a lower power state. For example, the drive current may be reduced from a "maximum" setting used during normal operation to a "minimum" setting suitable when no data transfer is permitted, such as during a suspend mode. Similarly, the slew rate may be decreased from a "high" setting required for normal operation and reliable data transfer to a "low" setting, resulting in lower power consumption.

As shown by graph 312, by altering these operational parameters, power consumption by the external memory 224 is reduced. For example, within the Freescale i.MX architecture, power consumption of the external memory 224 alone is reduced by about 0.33 mA in some implementations. Thus, power consumption by the otherwise dormant external memory 224 may be reduced by about 50%. Because the external memory 224 remains powered, albeit minimally, the external memory 224 may resume operation quickly.

Furthermore, where the external memory 224 is volatile, by retaining power to the device, data stored within the volatile memory is retained. For example, the external memory 224 may be placed into a self-refresh mode such that data stored therein is refreshed without external control, as well as having the operational parameters adjusted to reduce power consumption.

By reducing the power consumption to the external memory 224 while retaining the information stored therein, it becomes possible to keep the electronic device 100 in a suspend state for extended periods of time, rather than shutting the electronic device 100 completely off.

Retaining a device in a suspend state rather than completely off may provide several benefits. For example, an electronic device such as an eBook reader device 104(1) may be charged, configured, tested, and booted up during final checkout at a manufacturing facility from which the device may be shipped to the consumer, retailer, and so forth. The eBook reader device 104(1) may then be placed into the suspend mode for packaging and transshipment to the end user.

Placing the unit into suspend mode allows the device to startup more quickly than a cold boot or a hibernation mode where system state is stored on disk or in nonvolatile memory, improving an end user's first experience with the device. Rather than waiting for the device to boot a first time, the user instead sees a very fast resume of operation and a more pleasant out-of-box experience.

By reducing the power consumption to the external memory as described herein, the amount of time during which the electronic device may remain in this suspend mode is extended. This extended time thus allows more time for transshipment of eBook reader devices 104(1) from the manufacturing facility while preserving the beneficial out-of-box experience. For example, without the reduction in power consumption of the external memory 224, a battery in eBook reader device 104(1) may provide suspend mode power for about three months in some instances.

Given a three month battery life in suspend mode, the eBook reader device 104(1) would need to be in the user's hands within three months of leaving the factory to provide the positive out-of-box experience which results from resumption from suspend mode. By reducing the power consumption of the external memory by about half as described herein, the battery will provide power for a suspend mode of about six months in some instances, doubling time available for the positive out-of-box experience. This additional time allows for greater flexibility in manufacturing, transshipment, storage of an inventory of the eBook reader device 104(1), and so forth.

At 314, the suspend mode may be executed. This suspend mode may include a state retention mode, doze mode, or other low power state for the electronic device 100. One such doze mode is discussed in pending U.S. patent application Ser. No. 12/261,980 filed Oct. 30, 2008 and entitled "Low Power Mode for Processor," incorporated by reference in its entirety.

As a part of this suspend mode, a wait-for-interrupt instruction or other awakening mechanism is present. For example, upon receipt of an interrupt such as a user pressing a keypad, expiration of a wake-up timer, a touch event, charger attach/detach or so forth, the electronic device 100 may resume operation.

Typically upon resumption of operation the processor 202 would look to instructions stored within the external memory 224. However, because the operational parameters of the external memory 224 have been altered to reduce power consumption, the external memory 224 cannot be reliably read from. Thus, the processor 202 has been configured to look for instructions within the internal rewriteable memory 204. In particular, the processor 202 looks for the resume run mode 316 instructions within the suspend mode instructions 302 stored in the internal rewriteable memory 204.

At 316, the resume run mode instructions are configured to bring the electronic device 100 back to a running, "awake" mode. At 318 the operational parameters of the external memory 224 are re-configured to those required for normal operation of the external memory 224. Thus, in this example the drive current and slew rates are returned to "maximum" and "high," respectively. In some implementations, a slight delay may be introduced to allow for settling of the external memory 224 circuitry into an operational state.

At 320, the memory caches may be re-enabled. In some implementations the memory caches may be re-enabled prior to the modifying of operational parameters at 318.

The external memory 224 has now returned to an operational state such that data may be read from and written to the external memory. At 322, control is transferred from the suspend mode instructions 302 stored in the internal rewriteable memory 204 to the instructions within the suspend using internal rewriteable memory module 102 stored within external memory 224.

FIG. 4 is an illustrative flow diagram of a process 400 of entering and exiting a suspend mode using internal rewriteable memory 204. At 402, the electronic device 100 resides in a run mode. While in the run mode, the processor 202 and the external memory 224 are configured at typical operational power levels. At 404, a command to enter a suspend mode is executed. At 406, processes executing within the operating system 226 are frozen, while kernel threads within the kernel 228 are also frozen at 408. At 410, peripherals are placed into self-refresh, low power, power off, or other reduced-power modes. The suspend mode instructions 302 are copied from the external memory 224 to the internal rewriteable memory 204. In some implementations the external memory 224 may be placed into a self-refresh mode as well.

At 412, the processor 202 transfers control from instructions stored within the external memory 224 to those within the internal rewriteable memory 204. These instructions include the suspend mode instructions 302 discussed above with respect to FIG. 3, and contain instructions suitable for completing the entry into the suspend mode, and resumption of run mode.

Following transfer of the control to suspend mode, the electronic device enters the suspend mode as described above with respect to 304. Caches are invalidated, operational parameters of the external memory 224 are altered to reduce power consumption, and the suspend mode is executed.

At 414, the electronic device 100 resides in the suspend mode, awaiting a wakeup interrupt. Wakeup interrupts may be generated by events such as a user touching the keypad, a wakeup timer expiring, and so forth. At 416, the wakeup interrupt is received.

At 418, the processor 202 resumes operation and begins execution of instructions stored within the internal rewriteable memory 204. At this point, instructions stored within the external memory 224 are inaccessible due to the reduced power state of the external memory 224 resulting from the change in operational parameters such as drive current and slew rate. These instructions include the resume run mode 316 instructions, described above with respect to FIG. 3. Operational parameters of the external memory 224 are configured to those required for normal operation, control is transferred from instructions within the internal rewriteable memory 204 to the instructions within the suspend using internal rewriteable memory module 102 stored within external memory 224, and so forth.

FIG. 5 is an illustrative process 500 for entering and exiting a suspend mode using internal rewriteable memory 204. Operation 502 depicts the final stages of an eBook reader device 104(1) entering into a suspend mode. Control is transferred from the suspend using internal rewriteable memory module 102 stored in the external memory 224 to the suspend mode instructions 302 within the internal rewriteable memory 204.

Operation 504 shows the invalidating of the memory caches, and the alteration in the operational parameters of the external memory 224. Because control has been transferred from instructions within the external memory 224 to the suspend mode instructions 302 within the internal rewriteable memory 204, the external memory 224 may be safely placed into a lower power mode without concern for undefined system behavior. The electronic device 100 then enters the suspend mode and awaits a wakeup.

At 506, a wakeup interrupt is received, such as from a user pressing a key on the keypad. At 508, in response to the wakeup interrupt, the suspend mode instructions 302 relating to the resumption of run mode are executed from the internal rewriteable memory 204. Normal power consumption resumes and the electronic device 100 enters into awake mode and becomes available to process data. Control transfers from instructions in the internal rewriteable memory 204 to the external memory 224. The ebook reader device 104(1) is fully operational.

Instructions (code) in assembly language suitable for the i.MX.51 architecture from Freescale Semiconductor, Inc. for one implementation of using internal rewriteable memory to enter and exit a suspend mode are shown below. This code is provided as an example, not as a limitation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A system comprising:
   an internal rewriteable memory;
   an external memory;
   one or more processors coupled to the internal rewriteable memory and the external memory; and
   a plurality of instructions stored in the external memory and configured to execute on the one or more processors, the plurality of instructions being configured to:
      receive a command to enter a suspend mode;
      transfer a subset of suspend mode instructions from the external memory to the internal rewriteable memory, wherein the subset of the suspend mode instructions are configured to provide a final subset of operations of entry into a suspend mode for the external memory and a first subset of operations of a resume run mode for the external memory;
      freeze processes and kernel threads executing on the one or more processors;
      transfer control to the subset of suspend mode instructions stored in the internal rewriteable memory; and
      in response to transferring control to the subset of suspend mode instructions stored in the internal rewriteable memory:
         synchronize one or more memory caches of the one or more processors with the external memory;
         disable the one or more memory caches of the one or more processors;
         reduce a drive current for the external memory to a lowest level of a plurality of drive current levels available for the suspend mode of the external memory;
         reduce a switcher voltage for the external memory subsequent to reducing the drive current to the lowest level of the plurality of drive current levels;
         reduce a slew rate of the external memory; and
         cause the system to enter the suspend mode, wherein an additional subset of suspend mode instructions for a second subset of operations of the resume run mode for the external memory are stored in the external memory.

2. The system of claim 1, wherein the subset of the suspend mode instructions are stored in the external memory prior to being stored in the internal rewritable memory.

3. The system of claim 1, wherein the subset of the suspend mode instructions are configured to set the external memory into a self-refresh mode.

4. The system of claim 1, wherein the internal rewriteable memory is tightly coupled to the one or more processors.

5. The system of claim 1, wherein the suspend mode comprises a state retention mode configured to place the external memory into self-refresh mode and place the processor into a state retention mode.

6. The system of claim 1, wherein reducing the slew rate of the external memory comprises reducing the slew rate to a lowest slew rate of a plurality of slew rates available for operating the external memory in the suspend mode.

7. One or more non-transitory computer-readable storage media storing instructions that, when executed by one or more processors, cause the one or more processors to perform acts comprising:
   transferring a subset of suspend mode instructions from an external memory to an internal rewriteable memory, wherein the subset of the suspend mode instructions are configured to provide for a final subset of operations of entry into a suspend mode and a first subset of operations of entry into a resume run mode for the external memory, and wherein an additional subset of the suspend mode instructions are configured to remain stored in the external memory during the suspend mode and the additional subset of the suspend mode instructions provide for a second subset of operations of entry into the resume run mode for the external memory;
   synchronize one or more memory caches of the one or more processors with the external memory; and
   disable the one or more memory caches of the one or more processors.

8. The one or more non-transitory computer-readable storage media of claim 7, wherein the acts further comprise placing the external memory into a lower power state by altering operational parameters of the external memory, and wherein instructions stored within the internal rewriteable memory but not within the external memory are executed while the external memory is in the lower power state.

9. The one or more non-transitory computer-readable storage media of claim 7, wherein the internal rewriteable memory comprises an internal random access memory and the external memory comprises volatile random access memory.

10. The one or more non-transitory computer-readable storage media of claim 9, wherein the acts further comprise placing the processor into a state retention mode upon execution of at least a portion of the subset of the suspend mode instructions.

11. The one or more non-transitory computer-readable storage media of claim 10, wherein the acts further comprise setting one or more operational parameters of the external memory such that power consumption is reduced upon execution of at least a portion of the subset of the suspend mode instructions.

12. The one or more non-transitory computer-readable storage media of claim 7, wherein the acts further comprise remapping at least a portion of the internal rewriteable memory such that the remapped portion is executable by the processor.

13. A method comprising:
   under control of one or more processors configured with specific executable instruction,
   transferring a first subset of suspend mode instructions to a first memory device from a second memory device, wherein the first subset of the suspend mode instructions transferred from the second memory device to the first memory device are configured to provide for final operations of entry into a suspend mode, and wherein a second subset of the suspend mode instructions are configured to remain stored in the second memory device during the suspend mode and the second subset of the suspend mode instructions provide for final operations of a resume run mode;
   transferring control to the first subset of suspend mode instructions stored in the first memory device; and
   invalidating one or more caches that are configured for use with the first memory device.

14. The method of claim 13, further comprising:
remapping at least a portion of a memory address space within the first memory device such that the remapped portion is executable by the one or more processors.

15. The method of claim 13, wherein an operational parameter of the second memory device comprises a drive strength, and further comprising setting the drive strength to a lower setting.

16. The method of claim 13, wherein an operational parameter of the second memory device comprises a slew rate, and further comprising setting the slew rate to a lower setting.

17. The method of claim 13, wherein the first subset of the suspend mode instructions transferred from the second memory device to the first memory device are further configured to provide for initial operations of the resume run mode.

18. The method of claim 13, further comprising setting the one or more processors into a low power mode.

19. The method of claim 13, wherein the first memory device comprises internal random access memory.

20. The method of claim 13, wherein the second memory device comprises volatile memory.

21. A system comprising:
first and second memory devices;
one or more processors coupled to the first and second memory devices;
a plurality of instructions stored in the second memory device and configured to execute on the one or more processors, the plurality of instructions being configured to:
transfer a first portion of suspend mode instructions from the second memory device to the first memory device, wherein the first portion of the suspend mode instructions are configured to provide for a final subset of operations of entry into a suspend mode, and wherein a second portion of the suspend mode instructions are configured to remain stored in the second memory device during the suspend mode and the second portion of the suspend mode instructions provide for a final subset of operations of entry into a resume run mode; and
set a program counter register within the one or more processors to point to an address within the first memory device; and
invalidate one or more memory caches, wherein the one or more memory caches are configured for use with the first memory device.

22. The system of claim 21, wherein the first portion of the suspend mode instructions transferred to the first memory device are configured to set operational parameters of the second memory device to reduce consumption of electrical power and render the second memory device unusable for normal operation.

23. The system of claim 21, wherein the first portion of the suspend mode instructions transferred to the first memory device are configured to place the system into the suspend mode.

24. The system of claim 23, wherein the first portion of the suspend mode instructions transferred to the first memory device are further configured to modify two or more operational parameters of the second memory device.

25. The system of claim 21, wherein the first portion of the suspend mode instructions transferred to the first memory device are further configured to provide for an initial subset of operations of entry into the resume run mode.

* * * * *